United States Patent [19]

Beazley

[11] 4,230,581

[45] Oct. 28, 1980

[54] CENTRIFUGAL SEPARATORS

[75] Inventor: Rodney T. Beazley, Maidstone, England

[73] Assignee: The Glacier Metal Company, Limited, Middlesex, England

[21] Appl. No.: 961,461

[22] Filed: Nov. 16, 1978

Related U.S. Application Data

[63] Continuation of Ser. No. 779,761, Mar. 21, 1977, abandoned.

[30] Foreign Application Priority Data

Mar. 24, 1976 [GB] United Kingdom ............... 11779/76

[51] Int. Cl.$^2$ ............................................. B01D 17/00
[52] U.S. Cl. .................................. 210/261; 210/294; 210/304; 210/512 R; 233/23 R
[58] Field of Search ............... 210/261, 294, 304, 320, 210/322, 512 R; 233/23 R, 24

[56] References Cited

U.S. PATENT DOCUMENTS

| | | | |
|---|---|---|---|
| 2,799,448 | 7/1957 | Lee | 233/24 |
| 3,343,787 | 9/1967 | Kompert | 233/23 R |
| 3,373,874 | 3/1968 | Kompert | 210/512 R |
| 3,432,091 | 3/1969 | Beazley | 233/23 R |
| 3,443,696 | 5/1969 | Schutte | 210/304 |
| 3,452,870 | 7/1969 | Katsuta et al. | 210/304 |
| 3,698,555 | 10/1972 | Conner | 210/304 |

FOREIGN PATENT DOCUMENTS 227091   7/1969   Sweden .................................. 210/304

Primary Examiner—Charles N. Hart
Assistant Examiner—Peter A. Hruskoci
Attorney, Agent, or Firm—Oblon, Fisher, Spivak, McClelland & Maier

[57] ABSTRACT

A centrifugal separator for removing a dispersed solid from a liquid phase by the combined action of a cyclone and a centrifuge, the centrifuge being mounted co-axially on the cyclone.

2 Claims, 1 Drawing Figure

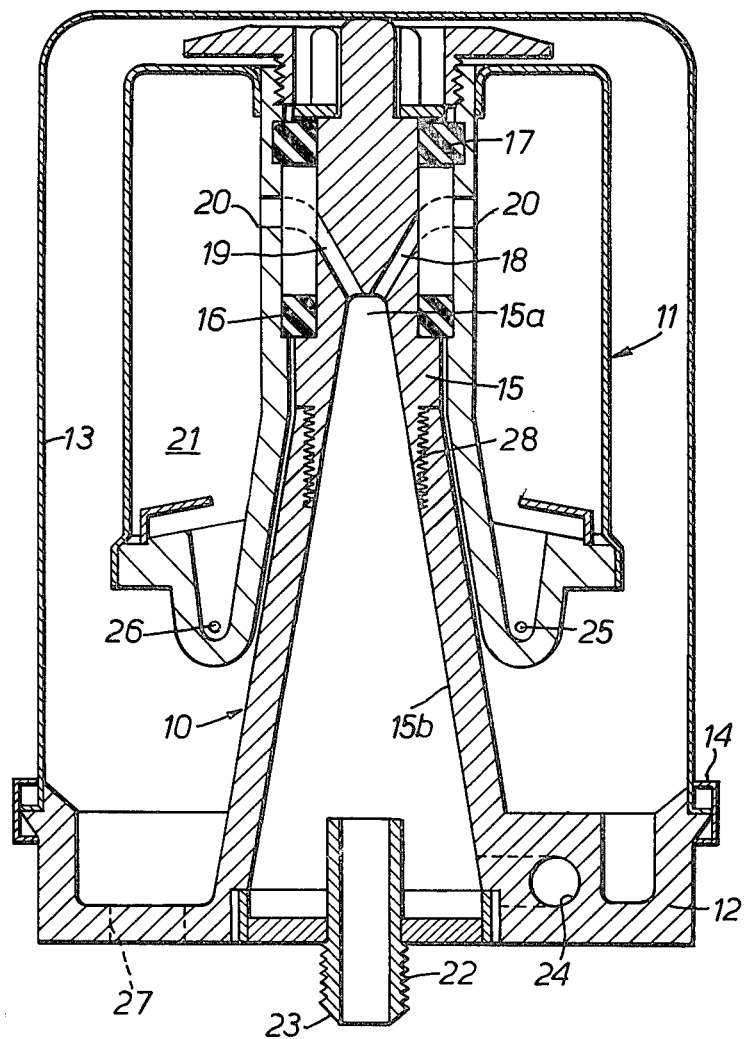

CENTRIFUGAL SEPARATORS

This is a continuation application Ser. No. 779,761, filed Mar. 21, 1977, now abandoned.

BACKGROUND OF THE INVENTION

1. Field of the Invention

The present invention relates to centrifugal separators, in particular, centrifugal separators for removing solid particles from a liquid phase by the use of centrifugal force, for example a centrifugal separator for cleaning lubricating oil.

SUMMARY OF THE INVENTION

According to the present invention, a centrifugal separator assembly includes a cyclone extending into a stem and a centrifuge chamber mounted on and capable of rotation about the stem, and passages for leading fluid into the cyclone and thence into the centrifuge chamber, and out. Preferably a substantial part of the axial length of the cyclone is co-extensive with a substantial part-perhaps one half-of the axial length of the centrifuge chamber.

Preferably, the passage connecting the cyclone and the centrifuge is a throttling passage, and it may be situated at or near the top of the chamber. In addition the passage for leading fluid into the cyclone and/or the passage for leading fluid out may also be a throttling passage to enable desired pressures to be established in the system. Preferably the cyclone also has a direct liquid outlet other than through the centrifuge.

The chamber may be provided with at least one tangentially-directed reaction jet for rotating it.

A centrifugal separator according to the invention may be used for cleaning lubricating oil for example in an engine. In this case, clean oil from the cyclone may be returned to the lubricating circuit while the clean oil from the centrifuge chamber may be returned to the engine sump.

BRIEF DESCRIPTION OF THE DRAWINGS

The invention may be carried into practice in various ways, and one embodiment will be described by way of example with reference to the accompanying drawings in which the single FIGURE is a vertical section through a centrifugal separator assembly according to the invention.

DETAILED DESCRIPTION OF THE PREFERRED EMBODIMENTS

The centrifugal separator comprises a cyclone and a centrifuge, shown generally at 10 and 11 respectively. The base 12 of the assembly, which is of cast aluminium, is integral with the cyclone and is attached to the external casing 13 by a clamping ring 14.

The upper portion 15 of the cyclone is generally conical in shape and has a conical apex 15a on which the centrifuge is mounted. The upper portion is formed from steel and provides the location for the centrifuge sleeve which is mounted on bearings 16 and 17. Passages 18 and 19 extend through the upper steel portion of the cyclone and communicate with the separation chamber 21 in the centrifuge via orifices 20 in the centrifuge. Separation chamber 21 is separated into upper and lower parts by a partition 30, 31 which includes a passage 32, 33 at the radial extremity thereof.

The top steel portion 15 of the cyclone screws down on to the bottom aluminium casting at the threaded section 28.

The cyclone is provided with a tangential oil inlet 24 and an axially disposed vortex finder 22 in its cylindrical end or base which provides an exit 23 for some of the cleansed oil on its return to the engine or machine.

Due to the shape of the cyclone, the factor V R remains constant all the way from the vortex finder 22 to the conical apex 15a at which point the particle velocity is greatly increased.

Two orifices 25 and 26 are located in the bottom bowl, or lower chamber of the separation chamber 21 so that any fluid issuing from them will set up a driving couple which will cause the centrifuge rotor to rotate.

When the centrifugal separator is in operation the contaminated oil mixture enters under pressure at inlet 24 and whirls around the vortex finder 22 and thence up the wall 15b of the cyclone 10 to the conical apex 15a. Cleansed oil tends to migrate to the centre of the vortex finder and is then directed to the engine or machine function. The contaminated mixture continues from the apex 15a through passages 18 and 19 to issue into the centrifuge through the orifices 20.

The action of the centrifuge causes the sludge from the mixture to move on to the inner cylindrical wall of the centrifuge rotor where it adheres evenly over the surface with a rubber-like consistency. The clean oil flows down into the bowl of the rotor where it issues through the orifices 25 and 26 to set up the driving couple for the rotor. The clean oil then returns to the sump via passage 27.

The drawing shows that a substantial part of the axial length of the cyclone is co-extensive with a substantial part about one-half- of the axial length of the centrifuge chamber, which makes for a very compact arrangement.

What is claimed as new and desired to be secured by Letters Patent of the United States is:

1. A centrifugal separator assembly comprising:
   a cyclone having a generally conical hollow internal chamber and a vortex finder,
   a stem having a lower end terminating at the conical end of said cyclone,
   upper and lower bearings mounted on said stem, said lower bearing being substantially at the same height as a part of said cyclone chamber;
   a centrifuge chamber mounted on said bearings and capable of rotation about said stem, said centrifuge chamber being axially oriented with respect to said cyclone and including a partition dividing the centrifuge chamber into upper and lower parts, the lower part being bounded by an inner wall which closely surrounds the outer side of the upper part of the cyclone wall, a substantial portion of the axial length of said cyclone being coextensive with at least one half of the axial length of said centrifuge chamber;
   a first passage for leading fluid into said cyclone including a tangential inlet;
   a second passage leading through the stem with an upward radial component from the apex of said generally conical cyclone chamber to an orifice formed in the rotary inner wall of said upper part of said centrifuge chamber;
   a third passage leading from the upper to the lower part of the centrifuge chamber at the radial extremity of the partition;

means for creating a driving couple which comprises at least one orifice disposed in the lower part of the centrifuge chamber; and, a fourth passage leading from said vortex finder to an outlet.

2. The centrifugal separator as set forth in claim 1 further comprising means for threadably engaging said cyclone with said stem.

* * * * *